United States Patent [19]

Takase

[11] Patent Number: 5,376,966
[45] Date of Patent: Dec. 27, 1994

[54] IMAGE READING APPARATUS HAVING A FUNCTION FOR CORRECTING DARK SIGNALS GENERATED IN A PHOTOELECTRIC CONVERSION ELEMENT

[75] Inventor: Osamu Takase, Yokohama, Japan

[73] Assignee: Ricoh Company, Ltd., Tokyo, Japan

[21] Appl. No.: 128,191

[22] Filed: Sep. 29, 1993

Related U.S. Application Data

[62] Division of Ser. No. 699,597, May 14, 1991, Pat. No. 5,278,658.

[30] Foreign Application Priority Data

| May 15, 1990 | [JP] | Japan | 2-124505 |
| May 16, 1990 | [JP] | Japan | 2-126002 |
| Mar. 13, 1991 | [JP] | Japan | 3-73835 |

[51] Int. Cl.$^5$ .......................... H04N 5/335
[52] U.S. Cl. ................................. 348/243
[58] Field of Search ............. 358/213.16, 213.15, 358/213.11, 177; H04N 5/335; 348/241, 243, 294

[56] References Cited

U.S. PATENT DOCUMENTS

| 4,293,877 | 10/1981 | Tsunekawa et al. | 358/213.16 |
| 4,484,223 | 11/1984 | Tsunekawa | 358/213.16 |
| 4,630,121 | 12/1986 | Suzuki et al. | 358/227 |
| 5,132,801 | 7/1992 | Yamano | 358/213.16 |

Primary Examiner—Joseph Mancuso
Assistant Examiner—Tuan V. Ho
Attorney, Agent, or Firm—Oblon, Spivak, McClelland, Maier, & Neustadt

[57] ABSTRACT

An image reading apparatus includes a photoelectric conversion element which has a plurality of cells, the plurality of cells including shielded cells which are optically shielded so that each shielded cell outputs only the dark signal, a dark signal data generating system for generating dark signal data for each cell of the photoelectric conversion element, the dark signal data corresponding to a ratio of an image signal output from each cell under a no-exposure condition to a first reference dark signal which is obtained based on the dark signals output from the shielded cells under the no-exposure condition, a dark signal data memory for storing the dark signal data for each cell, a dark signal component generating system for generating a dark signal component for each cell, the dark signal component corresponding to a product of the dark signal data for each cell multiplied by a second reference dark signal which is obtained based on the dark signals output from the shielded cells under the exposure condition, and a subtracter for subtracting the dark signal component from an image signal obtained for each corresponding cell under the exposure condition.

7 Claims, 15 Drawing Sheets

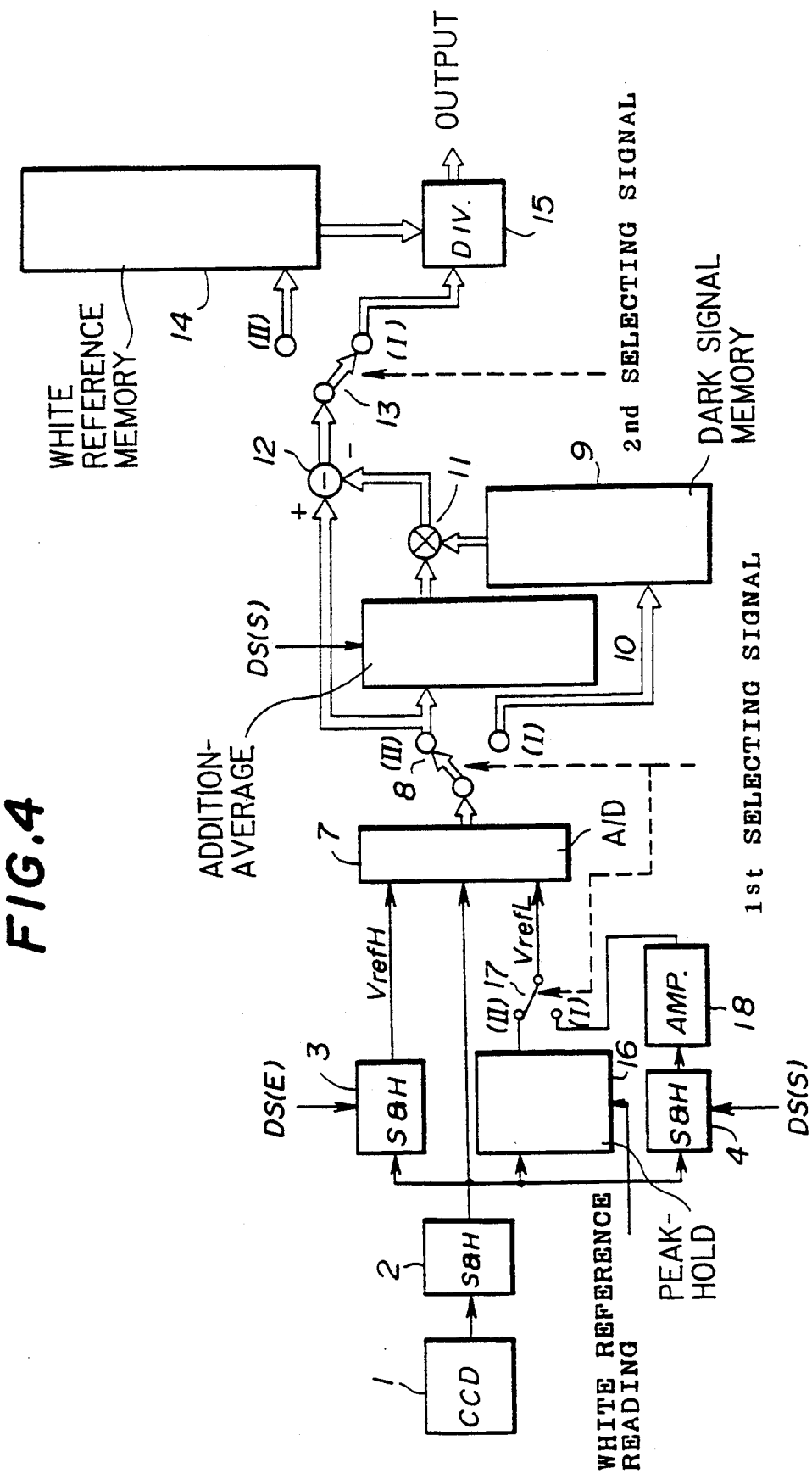

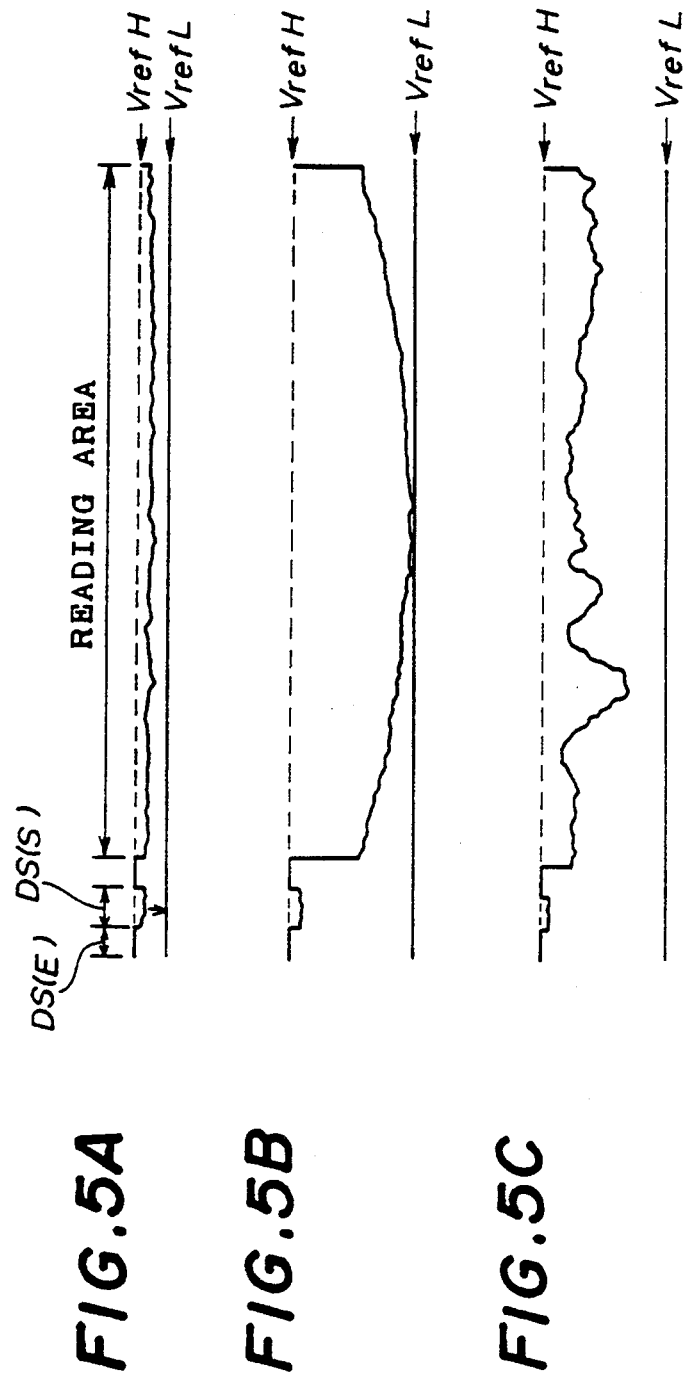

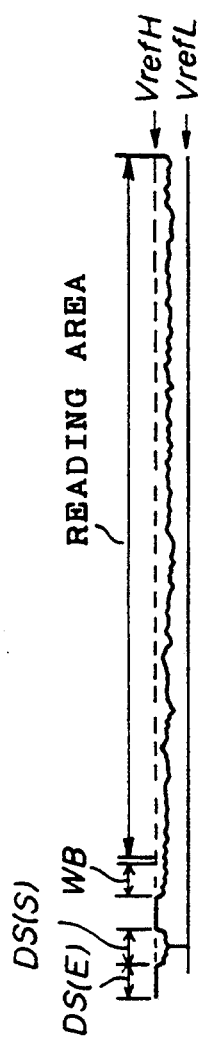
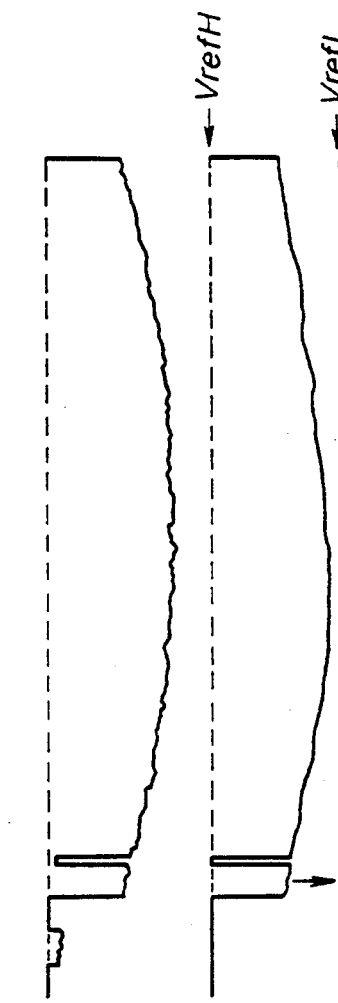
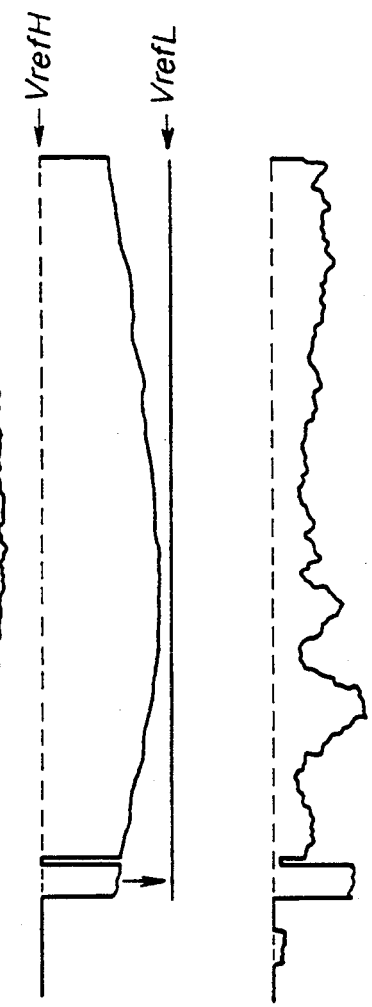
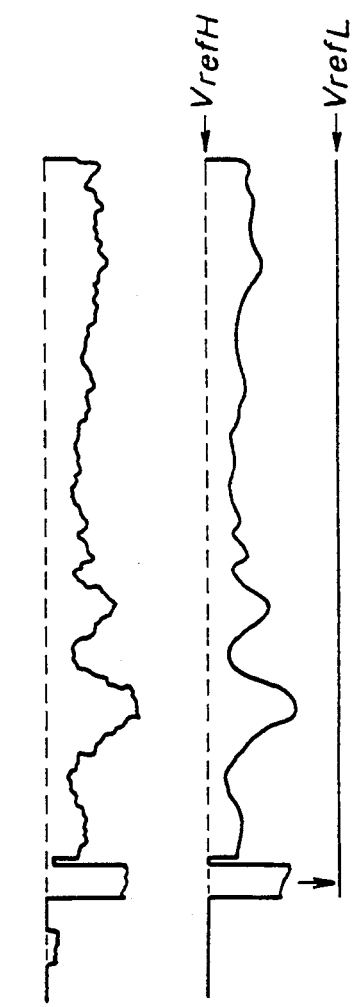
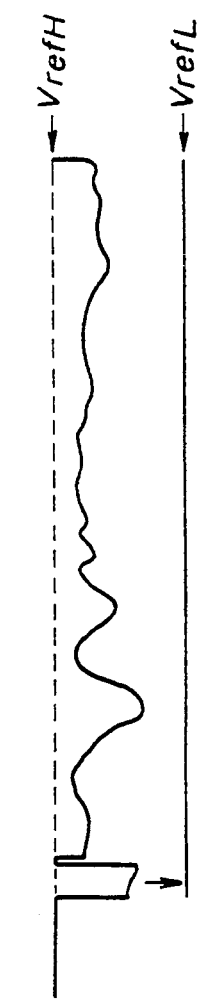
FIG.10A
FIG.10B
FIG.10C
FIG.10D
FIG.10E

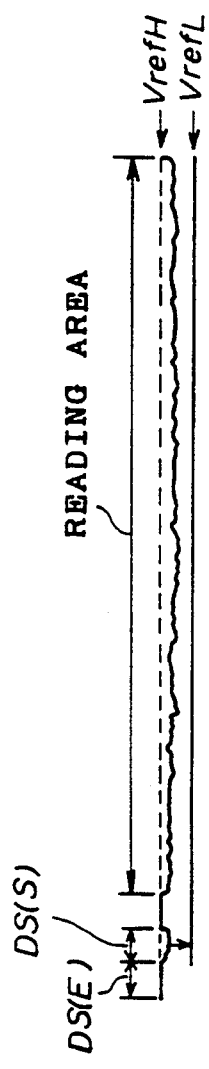
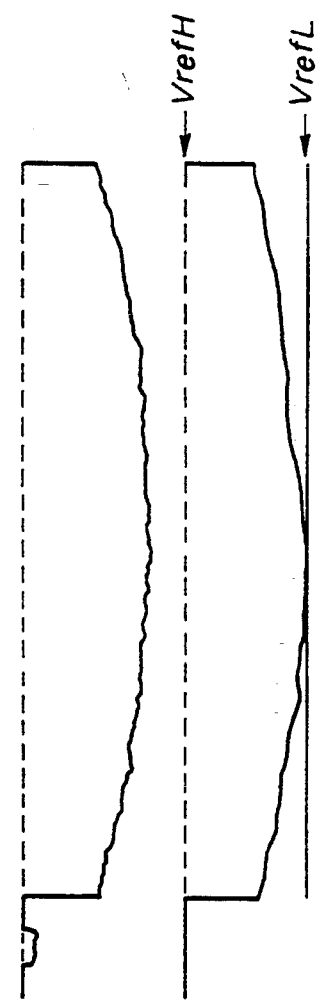
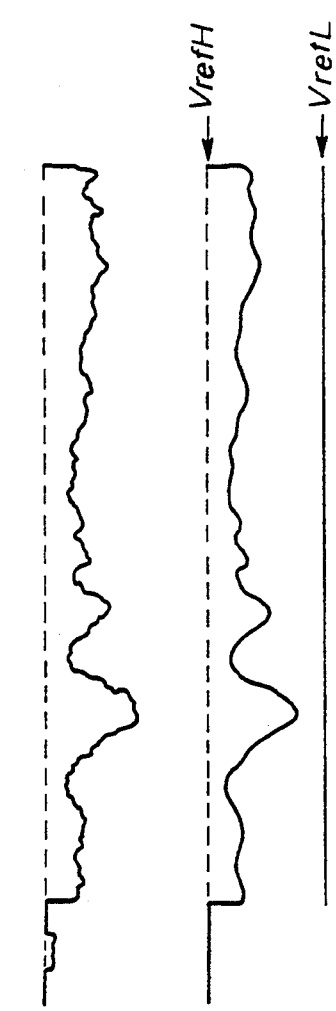
FIG.12A
FIG.12B
FIG.12C
FIG.12D
FIG.12E

IMAGE READING APPARATUS HAVING A FUNCTION FOR CORRECTING DARK SIGNALS GENERATED IN A PHOTOELECTRIC CONVERSION ELEMENT

This is a division, of application Ser. No. 07/699,597, filed on May 14, 1991 now U.S. Pat. No. 5,278,658.

BACKGROUND OF THE INVENTION

The present invention generally relates to an image reading apparatus, and more particularly to an image reading apparatus having a photoelectric conversion element in which a plurality of cells are arranged in a line.

A photoelectric conversion element such as a CCD sensor is used for an input device of a copy machine, a facsimile, an image filing apparatus or the like, which input device reads an image formed on a document. In the photoelectric conversion element, a plurality of cells are arranged in a line so that an image can be read at a resolution in a range between a value of a few dots per millimeter and a value of several tens of dots per millimeter. Electric charges integrated in respective cells of the photoelectric conversion element are shifted to an analog transmission path and then the electric charges are successively transmitted in the analog transmission path so that a main scanning is carried out in a direction of the arrangement of the cells, and the photoelectric conversion element moves in a direction perpendicular to the direction of the arrangement of the cells so that a sub scanning is carried out. Due to the main scanning and the sub scanning by the photoelectric conversion element with respect to the document, the image formed on the document can be read. An image reading apparatus having the photoelectric conversion element as described above is, for example, disclosed in Japan Patent Laid Open Publication No. 62-235872.

In the photoelectric conversion element, each cell outputs an image signal which is the sum of a photoelectric conversion signal corresponding to an exposure of the document and a dark signal corresponding to a dark current which is generated in each cell independently from the exposure thereof. Thus, to accurately obtain image signals corresponding to information formed on the document, it is necessary to correct the image signal obtained from each cell of the photoelectric conversion element so that the dark signal is removed from the image signal obtained from each cell.

Conventionally, the following apparatuses each having a function for correcting the signal obtained from each cell of the photoelectrical conversion element have been proposed.

In a first image reading apparatus, several cells positioned at an end portion of the photoelectric conversion element are optically shielded. Each of the cells optically shielded outputs only the dark signal. When the document on which an image is formed is read by the photoelectric conversion element, an average, for example, of the dark signals output from the cells optically shielded is removed from the image signal output from each of the cells arranged in an effective area for obtaining information about the document. However, in the first image reading apparatus, as the dark currents generated in the cells are different from each other, it is difficult to accurately remove the dark signal from the image signal output from each cell arranged in the effective area.

In a second image reading apparatus, a dark signal which is output from each cell under a condition where there is no exposure is stored in a memory. Then, when the document on which an image is formed is read by the photoelectric conversion element, the dark signal stored in the memory for each cell is removed from the image signal output from each corresponding cell of the photoelectric conversion element. In the second image reading apparatus, when the image formed on the document is read, at an initial time the dark signal can be accurately removed from the signal output from each cell. However, as the dark signal for each cell varies with the passage of time, it gradually becomes difficult to accurately remove the dark signal from the image signal output from each cell. In general, the dark signal for each cell greatly varies in accordance with the temperature of the photoelectric conversion element. In a CCD image sensor, for example, when the temperature of the photoelectric conversion element increases by 8° C., the level of the dark signal for each cell is doubled. That is, in a case where a reading time of a few seconds is required for reading one document on which an image is formed, the dark signal for each cell varies with the passage of time while the image is being read.

SUMMARY OF THE INVENTION

Accordingly, a general object of the present invention is to provide a novel and useful image reading apparatus in which the disadvantages of the aforementioned prior art are eliminated.

A more specific object of the present invention is to provide an image reading apparatus in which the correct image signal for each cell can be always obtained even if the dark signals for the cells differ from each other.

Another object of the present invention is to provide an image reading apparatus in which the correct image signal for each cell can always be obtained even if the dark signal for each cell varies with the passage of time.

The above objects of the present invention are achieved by an image recording apparatus comprising: a photoelectric conversion element which has a plurality of cells, each cell generating an image signal including a photoelectric conversion signal corresponding to the amount of light incident thereto and a dark signal based on a dark current generated therein, the plurality of cells including shielded cells which are optically shielded so that each shielded cell outputs only the dark signal; dark signal data generating means for generating dark signal data for each cell of the photoelectric conversion element under a no-exposure condition where there is no light incident to the photoelectric conversion element, the dark signal data corresponding to a ratio of an image signal output from each cell under the no-exposure condition to a first reference dark signal which is obtained based on the dark signals output from the shielded cells under the no-exposure condition; dark signal data storage means, coupled to the dark signal data generating means, for storing the dark signal data for each cell of the photoelectric conversion element; dark signal component generating means for generating a dark signal component for each cell of the photoelectric conversion element under an exposure condition where a light is incident to the photoelectric conversion element, the dark signal component corresponding to a product of the dark signal data stored for each cell in the dark signal data storage means multiplied by a second reference dark signal which is obtained based on the dark signals output from the shielded cells under the exposure condition; and dark signal removing means, coupled to the dark signal component generating means, for removing the dark signal component generated for each cell by the dark signal component generating means from an image signal obtained for each corresponding cell of the photoelectric conversion element under the exposure condition, wherein the image reading apparatus outputs the image signal from which the dark signal component is removed for each cell of the photoelectric conversion element.

The above objects of the present invention are also achieved by an image reading apparatus comprising: a photoelectric conversion element which has a plurality of cells, each cell generating an image signal including a photoelectric conversion signal corresponding to the amount of light incident thereto and a dark signal based on a dark current generated therein, the plurality of cells including shielded cells which are optically shielded so that each shielded cell outputs only the dark signal; dark signal data storage means for storing dark signal data for each cell of the photoelectric conversion element, the dark signal data having been previously generated for each cell under a no-exposure condition where there is no light incident to the photoelectric conversion element, the dark signal data corresponding to a ratio of an image signal generated from each cell under the no-exposure condition to a first reference dark signal which is obtained based on the dark signals output from the shielded cells under the no-exposure condition; dark signal component generating means for generating a dark signal component for each cell of the photoelectric conversion element under an exposure condition where a light is incident to the photoelectric conversion element, the dark signal component corresponding to a product of the dark signal data stored for each cell in the dark signal data storage means multiplied by a second reference dark signal which is obtained based on the dark signals output from the shielded cells under the exposure condition; and dark signal removing means, coupled to the dark signal component generating means, for removing the dark signal component generated for each cell by the dark signal component generating means from an image signal output from each corresponding cell of the photoelectric conversion element under the exposure condition, wherein the image reading apparatus outputs the image signal from which the dark signal component is removed for each cell of the photoelectric conversion element.

Additional objects, features and advantages of the present invention will become apparent from the following detailed description when read in conjunction with the accompanying drawings.

BRIEF DESCRIPTION OF THE DRAWINGS

FIG. 4 is a block diagram illustrating a structure of an image reading apparatus according to a second embodiment;

FIGS. 5A, 5B, and 5C are wave shape diagrams illustrating signals supplied to an analog-digital converter shown in FIG. 4 in various cases;

FIGS. 10A, 10B, 10C, 10D and 10E are wave shape diagrams illustrating signals supplied to an analog-digital converter shown in FIG. 9 in various cases;

FIGS. 12A, 12B, 12C, 12D and 12E are wave shape diagrams illustrating signals supplied to an analog-digital converter shown in FIG. 11 in various cases;

DESCRIPTION OF THE PREFERRED EMBODIMENTS

A description will now be given of a first embodiment of the present invention with reference to FIGS. 1A, 1B, 2, 3A, 3B and 3C.

Figure 1A:
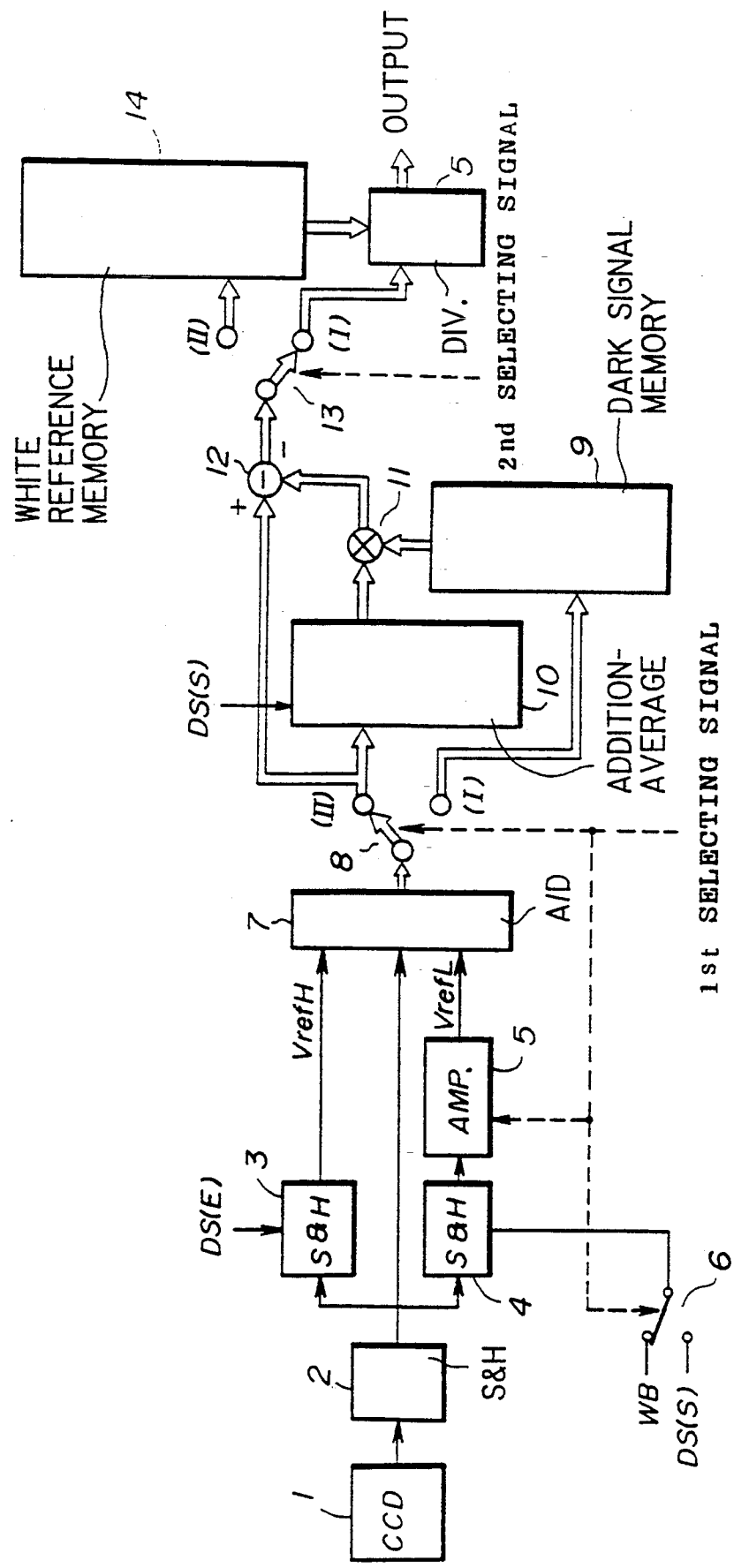
FIG. 1A is a block diagram illustrating a structure of an image reading apparatus according to a first embodiment of the present invention.
Figure 1B:
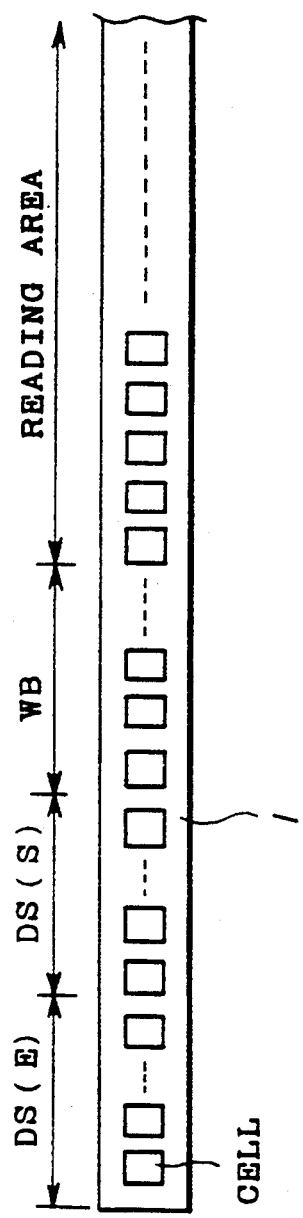
FIG. 1B is a diagram illustrating a structure of a CCD sensor shown in FIG. 1A.

Referring to FIG. 1, which shows an image reading apparatus having a function for forming correct image signals for respective cells of the photoelectric conversion element, a CCD sensor 1 is used as the photoelectric conversion element. The CCD sensor 1 has a plurality of cells which are arranged in a line. A first dummy signal area DS(E) and a second dummy signal area DS(S) are arranged at an end portion of the CCD sensor 1, as shown in FIG. 1B. Each of cells in the first dummy signal area DS(E) does not have a photosensitive portion so that an image signal is not generated therein. Each of cells in the second dummy signal area DS(S) is optically shielded so that only a dark signal corresponding to a dark current generated therein is output therefrom. A white detecting area WB is arranged between the second dummy signal area DS(S) and a reading area where cells for reading a document are arranged. Cells in the white detecting area WB read a white reference plate provided adjacent to the document. Image signals output from respective cells of the CCD sensor 1 are sampled and held in a first sample-hold circuit 2 in synchronism with a predetermined clock signal. While the first sample-hold circuit 2 is sampling signals for cells in the first dummy signal area DS(E), the signals held in the first sample-hold circuit 2 are successively transferred to a second sample-hold circuit 3 and sampled and held in the second sample-hold circuit 3 in synchronism with the clock signal. A selector 6 selects either a first position (I) or a second position (II) in accordance with a first selecting signal supplied from an external controller (not shown). In a case where the selector 6 selects the first position (I), while the first sample-hold circuit 2 is sampling signals for cells in the second dummy signal area DS(S), the signals held in the first sample-hold circuit 2 are successively transferred to a third sample-hold circuit 4 in synchronism with the clock signal. In a case where the selector 6 selects the second position (II), while the first sample-hold circuit 2 is sampling signals for cells in the white detecting area WB, the signals held in the first sample-hold circuit 2 are successively transferred to the third sample-hold circuit 4 in synchronism with the clock signal. The third sample-hold circuit 4 holds, for example, an average signal having an average level of signals sampled therein. The average signal output from the third sample-hold circuit 4 is amplified by an amplifier 5 and supplied to an analog-digital converter 7 as a lower reference signal $V_{refL}$. An amplification of the amplifier 5 is changed in accordance with the first selecting signal. A signal held in the second sample-hold circuit 3 is supplied to the analog-digital converter 7 as an upper reference signal $V_{refH}$. The image signals held in the first sample-hold circuit 2 are successively supplied to the analog-digital converter 7 in synchronism with a predetermined apparatus so that the image signals are converted into digital data. The analog-digital converter 7 converts the supplied image signal into the digital data based on the upper reference signal $V_{refH}$ and the lower reference signal $V_{refL}$. When the image signal having a level equal to or greater than the level of the upper reference signal $V_{refH}$ is supplied to the analog-digital converter 7, the analog-digital converter 7 outputs upper reference data corresponding to the level of the upper reference signal $V_{refH}$. When the signal having a level equal to or less than the level of the lower reference signal $V_{refL}$ is supplied to the analog-digital converter 7, the analog-digital converter 7 outputs lower reference data corresponding to the level of the lower reference signal $V_{refL}$. When the signal having a level within a range between the level of the lower reference signal $V_{refL}$ and the upper reference signal $V_{refH}$ is supplied to the analog-digital converter 7, the analog-digital converter 7 outputs digital data corresponding to the ratio of the level of a signal supplied from the first sample-hold circuit 2 to the level of a reference value. The reference value is defined as the ratio of the level of the upper reference signal $V_{refH}$ to the level of the lower reference signal $V_{refL}$.

A selector 8 selects either a first position (I) or a second position (II) in accordance with the above first selecting signal supplied from the external controller. When the selector 8 selects the first position (I), the data output from the analog-digital converter 7 is supplied to a dark signal memory 9. When the selector 8 selects the second position (II), the data output from the analog-digital converter 7 is supplied to an addition-average circuit 10 and a subtracter 12. Output data from the addition-average circuit 10 and output data read out from the dark signal memory 9 are supplied to a multiplier 11 so that both data are multiplied together, and the subtracter 12 subtracts the calculating result obtained by the multiplier 11 from the data supplied from the analog-digital converter 7 via the selector 8.

A selector 13 selects either a first position (I) or a second position (II) in accordance with a second selecting signal supplied from the external controller. When the selector 13 selects the first position (I), the data obtained by the subtracter 12 is supplied to a divider 15. When the selector 13 selects the second position (II), the data obtained by the subtracter 12 is supplied to a white reference memory 14. The divider 15 divides the data supplied via the selector 13 by the data stored in the white reference memory 14.

Figures 2A, 2B:
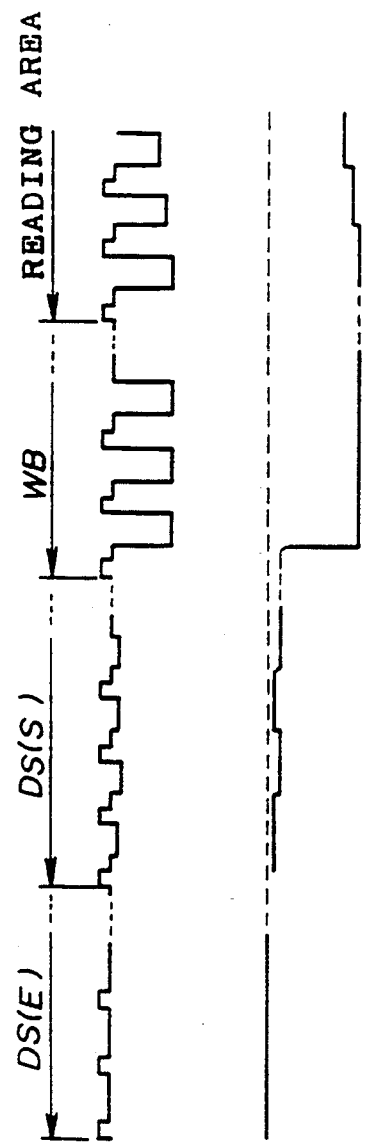
FIG. 2A is a wave shape diagram illustrating a signal output for one line from the CCD sensor.
FIG. 2B is a wave shape diagram illustrating a signal output for one line from a first sample-hold circuit.

An output signal for one line from the CCD sensor 1 has a wave shape as shown in FIG. 2A. When the above output signal is sampled in the first sample-hold circuit 2, a component of a transferring clock used in the CCD sensor 1 is removed from the output signal as shown in FIG. 2A so that the signal for one line output from the first sample-hold circuit 2 has a wave shape as shown in FIG. 2B.

In the image reading apparatus described above, first, a dark signal level for each cell in one line of the CCD sensor 1 is detected.

In this case, both of the selectors 6 and 8 select the first position (I) based on the first selecting signal supplied from the external controller. The signal for one line output from the CCD sensor 1 is sampled by the first sample-hold circuit 2 under a condition where there is no exposure. Thus, the level of the signal corresponding to the dark current for each cell is sampled in the sample-hold circuit 2. When this sampling is carried out, the signal for the cell in the first dummy signal area DS(E) is used as the upper reference signal $V_{refH}$ of the analog-digital converter 7, and the average of the signals for the cells in the second dummy signal area DS(S) is amplified by the amplifier 5 and used as the lower reference signal $V_{refL}$ of the analog-digital converter 7. The signal for one line output from the CCD sensor 1 varies within a range between the upper reference signal level $V_{refH}$ and the lower reference signal level $V_{refL}$, as shown in FIG. 3A.

Figures 3A, 3B, 3C:
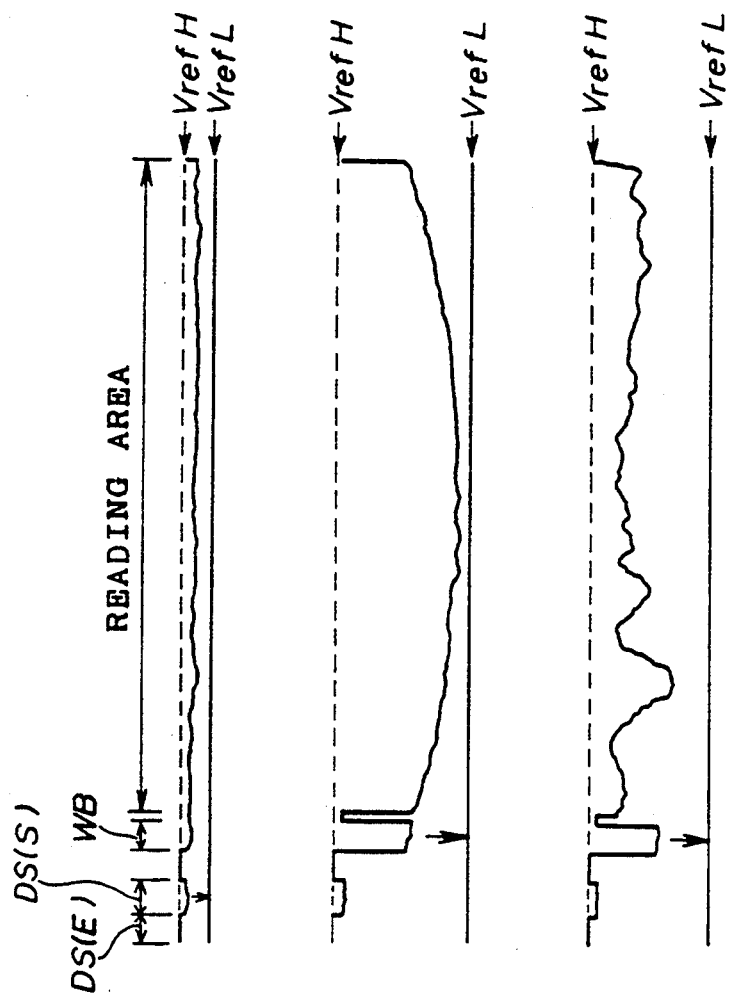
FIGS. 3A, 3B and 3C are wave shape diagrams illustrating signals supplied to an analog-digital converter shown in FIG. 1A in various cases.

The signal which varies as shown in FIG. 3A is formed of the dark signals for the cells in one line of the CCD sensor 1. The dark signal for each cell in one line is converted into the digital data by the analog-digital converter 7 and stored in the dark signal memory 9. The digital data for each cell stored in the dark signal memory 9 is referred to as a dark signal data. As the lower reference signal $V_{refL}$ corresponds to the average of the dark signals for the cells in the second dummy area DS(S) of the CCD sensor 1, the dark signal data for each cell is represented by the following formula:

$$d_{BK}/\overline{d_{BK}} \quad (1)$$

where, $d_{BK}$ denotes the level of the dark signal for each cell of the CCD sensor 1 and varies in accordance with the position (N) of each cell, and $\overline{d_{BK}}$ denotes the average of the dark signals for the cells in the second dummy area DS(S). That is, the dark signal data for each cell is represented by the ratio of the level of the dark signal for each cell to the level of the average of the dark signals for the cells which are optically shielded (DS(S)).

When the dark signal data for each cell in one line of the CCD sensor 1 is completely stored in the dark signal memory 9, a signal corresponding to a predetermined white reference is sampled for each cell of the CCD sensor 1.

In this case, both of the selectors 6 and 8 select the second position (II) based on the first selecting signal supplied from the external controller, and the selector 13 selects the second position (II) based on the second selecting signal supplied from the external controller. When the CCD sensor 1 scans a white reference plate, the signal corresponding to the white reference for each cell in the first sample-hold circuit 2 is sampled. Then the sampled signal for each cell is supplied to the analog-digital converter 7. The signal for the cell in the first dummy area DS(E) which is sampled in the second sample-hold circuit 3 is used as the upper reference signal $V_{refH}$ of the analog-digital converter 7. The average of white signals for the cells in the white detecting area WB is held in the third sample-hold circuit 4 and supplied via the amplifier 5 to the analog-digital converter 7 and used as the lower reference signal $V_{refL}$ of the analog-digital converter 7. The signal for one line output from the CCD sensor 1 varies within a range between the level of the lower reference signal $V_{refL}$ and the level of the upper reference signal $V_{refH}$, as shown in FIG. 3B.

The signal sampled in the first sample-hold circuit 2 corresponds to the white reference, and the signal supplied from the first sample-hold circuit 2 to the analog-digital converter 7 is converted into digital data and supplied via the selector 8 to the addition-average circuit 10 and the subtracter 12. The addition-average circuit 10 successively adds the signal data for the cells in the second dummy signal area DS(S) and calculates the average of the signal data. The addition-average circuit 10 outputs data represented by the following formula (2):

$$\beta' \overline{d_{BK}}/(V_{refH}-V_{refL}) = \beta' \overline{d_{BK}}/[\kappa(d_{woref}+\beta' \overline{d_{BK}})] \quad (2)$$

where, $\beta'$ denotes the ratio of the dark signal level which is obtained for each cell in a case where the signal corresponding to the white reference is sampled to the dark signal level which is obtained for each cell in a case where there is no exposure, $\kappa$ denotes the amplification factor of the amplifier 5, and $d_{woref}$ denotes the level of the photoelectric conversion signal (white signal) for the cell in the white detecting area WB.

The data for each cell in the reading area of the CCD sensor 1 is supplied from the analog-digital converter 7 to a non-inverted terminal $\oplus$ of the subtracter 12. The data supplied to the non-inverted terminal $\oplus$ of the subtracter 12 is denoted by the following formula (3):

$$(d_{wo}+\beta' d_{BK})/(V_{refH}-V_{refL}) \\ = (d_{wo}+\beta' d_{BK})/[\kappa(d_{woref}+\beta' \overline{d_{BK}})] \quad (3)$$

where, $d_{wo}$ denotes the level of the signal for each cell in a case where the CCD sensor 1 scans the white reference plate to obtain the white reference.

The multiplier 11 multiplies the data output from the addition-average circuit 10 by the dark signal data for each cell read out from the dark signal memory 9. Thus, the multiplier 11 outputs the data represented by the following formula (4):

$$\beta' \overline{d_{BK}}/[\kappa(d_{woref}+\beta' \overline{d_{BK}})] \times d_{BK}/\overline{d_{BK}} = \beta' d_{BK}/[\kappa(d_{woref}+\beta' \overline{d_{BK}})] \quad (4)$$

The data output from the multiplier 11 is supplied to an inverted terminal $\ominus$ of the subtracter 12 so that the data represented by the above formula (4) is subtracted from the data represented by the above formula (3). As a result, the data represented by the following formula (5) is output from the subtracter 12.

$$d_{wo}/[\kappa(d_{woref}+\beta' \overline{d_{BK}})] \quad (5)$$

The data represented by the above formula (5) is white reference data for each cell in a line of the CCD sensor 1. Then the white reference data for each cell is supplied via the selector 13 to the white reference memory 14 and stored therein.

After the white reference data for each cell in one line of the CCD sensor 1 is stored in the white reference memory 14, the CCD sensor 1 scans the document on which an image is formed.

In this case, both of the selectors 6 and 8 are maintained at the second position (II) based on the first selecting signal supplied from the external controller. The selector 13 selects the first position (I) based on the second selecting signal supplied from the external controller.

The signal for the cell in the first dummy signal area DS(E) is used as the upper reference signal $V_{refH}$ of the analog-digital converter 7, and the average of the signals for the cells in the white detecting area WB is used as the lower reference signal $V_{refL}$ of the analog-digital converter 7. The signal for one line output from the CCD sensor 1 varies within a range between the level of the lower reference signal $V_{refL}$ and the level of the upper reference signal $V_{refH}$, as shown in FIG. 3C. The photoelectric conversion signal for each cell output from the CCD sensor 1 is supplied via the second sample-hold circuit 2 to the analog-digital converter 7 and converted into the digital data. In this case, the data output from the analog-digital converter 7 is supplied to the addition-average circuit 10 and the subtracter 12 in the same manner as that in the above case where the white reference data for each cell of the CCD sensor 1 is sampled. As a result, the subtracter 12 outputs the data represented by the following formula (6) corresponding to the above formula (5):

$$d_{mo}/[\kappa(d_{woref}+\beta \overline{d_{BK}})] \quad (6)$$

where, $d_{mo}$ denotes the photoelectric conversion signal for each cell in a case where the CCD sensor 1 scans the document on which the image is formed, and $\beta$ denotes the ratio of the dark signal level which is obtained for each cell in a case where the CCD sensor 1 scans the document on which the image is formed to the dark signal level which is obtained for each cell in a case where there is no exposure. The data represented by the above formula (6) is the image data for each cell of the CCD sensor 1. The image data output from the subtracter 12 is supplied via the selector 13 to the divider 15. The divider 15 divides the image data supplied from the subtracter 12 for each cell by the white reference data read out from the white reference memory 14 for each corresponding cell. As the image data for each cell is represented by the above formula (6) and the white reference data for each corresponding cell is represented by the above formula (5), the divider 15 outputs the data represented by the following formula (7):

$$d_{mo}/d_{wo} \times (d_{woref}+\beta' \overline{d_{BK}})/(d_{woref}+\beta \overline{d_{BK}}) \quad (7)$$

The data output from the divider 15 is basically the ratio of the level of the photoelectric conversion signal $d_{mo}$ to the level of the white reference signal $d_{wo}$. That is, the driver 15 carries out a shading compensation for each cell of the CCD sensor 1. The shading compensated image data which is output for each pixel from the divider 15 is, for example, supplied to a printer unit.

The above formula (7) representing the shading compensated image data for each pixel does not include a term of the dark signal $d_{BK}$ for each corresponding cell of the CCD sensor 1. Thus, even if the dark signal $d_{BK}$ for each cell of the CCD sensor 1 varies with the passage of time, the shading compensated image data for each corresponding pixel is not affected by the variation of the dark signal $d_{BK}$. However, as the coefficients $\beta$ and $\beta'$ slightly differ from each other, when the average $\overline{d_{BK}}$ of the dark signals for the cells which are optically shielded (DS(S)) varies, the shading compensated image data for each pixel is slightly affected by the variation of the average $\overline{d_{BK}}$ of the dark signals.

In the above first embodiment, the average of the dark signals for the cells in the second dummy signal area DS(S) is used as the lower reference signal $V_{refL}$ of the analog-digital converter. But, one of the dark signals for the cells in the second dummy signal area DS(S) can also be sampled, as a representative dark signal, in the third sample-hold circuit 4. Then, the representative dark signal can be used as the lower reference signal $V_{refL}$ of the analog-digital converter 7.

A description will now be given of a second embodiment of the present invention with reference to FIGS. 4, 5A, 5B and 5C. In FIG. 4, which illustrates a structure of an image reading apparatus, those parts which are the same as those shown in FIG. 1 are given the same reference numbers.

In the CCD sensor 1 used in the image reading apparatus shown in FIG. 4, the white detecting area WB shown in FIG. 1B is omitted, so that the CCD sensor 1 has cells arranged in the first dummy signal area DS(E), cells arranged in the second dummy signal area DS(S) and cells arranged in the reading area. Each cell in the first dummy signal area DS(E) has no photoelectric conversion portion and each cell in the second dummy signal area DS(S) is optically shielded.

As the CCD sensor 1 does not have the white detecting area WB in it, the image reading apparatus shown in FIG. 4 has a peak-hold circuit 16. When the CCD sensor 1 scans the white reference plate for one line, a peak level of the signal output from the CCD sensor 1 is held in the peak-hold circuit 16. The peak level held in the peak-hold circuit 16 is supplied via a selector 17 to the analog-digital converter 7, and used as the lower reference signal $V_{ref}$ of the analog-digital converter 7 in a case where the white reference data for each cell of the CCD sensor 1 is obtained.

When the dark signal level for each cell is detected, the average of the signals for the cells in the second dummy signal area DS(S) is held in the third sample-hold circuit 4, and supplied via an amplifier 18 and the selector 17 to the analog-digital converter 7. Then the average of the signals for the cells in the second dummy signal area DS(S) is used as the lower reference signal $V_{refL}$.

Other operations in the image reading apparatus shown in FIG. 4 are the same as the operations of the first embodiment, shown in FIG. 1. In the second embodiment, when the dark signal level for each cell is detected, the signal for one line output from the CCD sensor 1 varies within a range between the level of the lower reference signal $V_{refL}$ and the level of the upper reference signal $V_{refH}$, as shown in FIG. 5A. When the white reference data for each cell is sampled, the signal for one line output from the CCD sensor 1 varies as shown in FIG. 5B. When the CCD sensor 1 scans the document on which the image is formed, the signal for one line output from the CCD sensor 1 varies as shown in FIG. 5C.

When the CCD sensor 1 scans the document, the document is irradiated by light from a lighting system. In a case where the amount of light from the lighting system hardly varies when the CCD sensor 1 scans the document, the image reading apparatus according to the second embodiment can have the same advantages as those according to the first embodiment.

When a integral time for each cell of the CCD sensor 1 increases, the charge amount stored in each cell increases so that the level of the signal output from each cell increases. Thus, in the above first and second embodiments, it is preferable that the integral time for each cell in a case where the dark signal is detected be greater than that for each cell in a case where the CCD sensor 1 scans the document. In this case, as the level of the dark signal for each cell increases, influences of various noises on the dark signal can be relatively decreased. As the dark signal data stored in the dark signal memory 9 corresponds to the ratio of the level of the dark signal for each cell to the average of the dark signals for the cells which are optically shielded (DS(S)), even if the dark signal for each cell increases due to the increasing of the integral time, the dark signal data does not vary.

Figure 6:
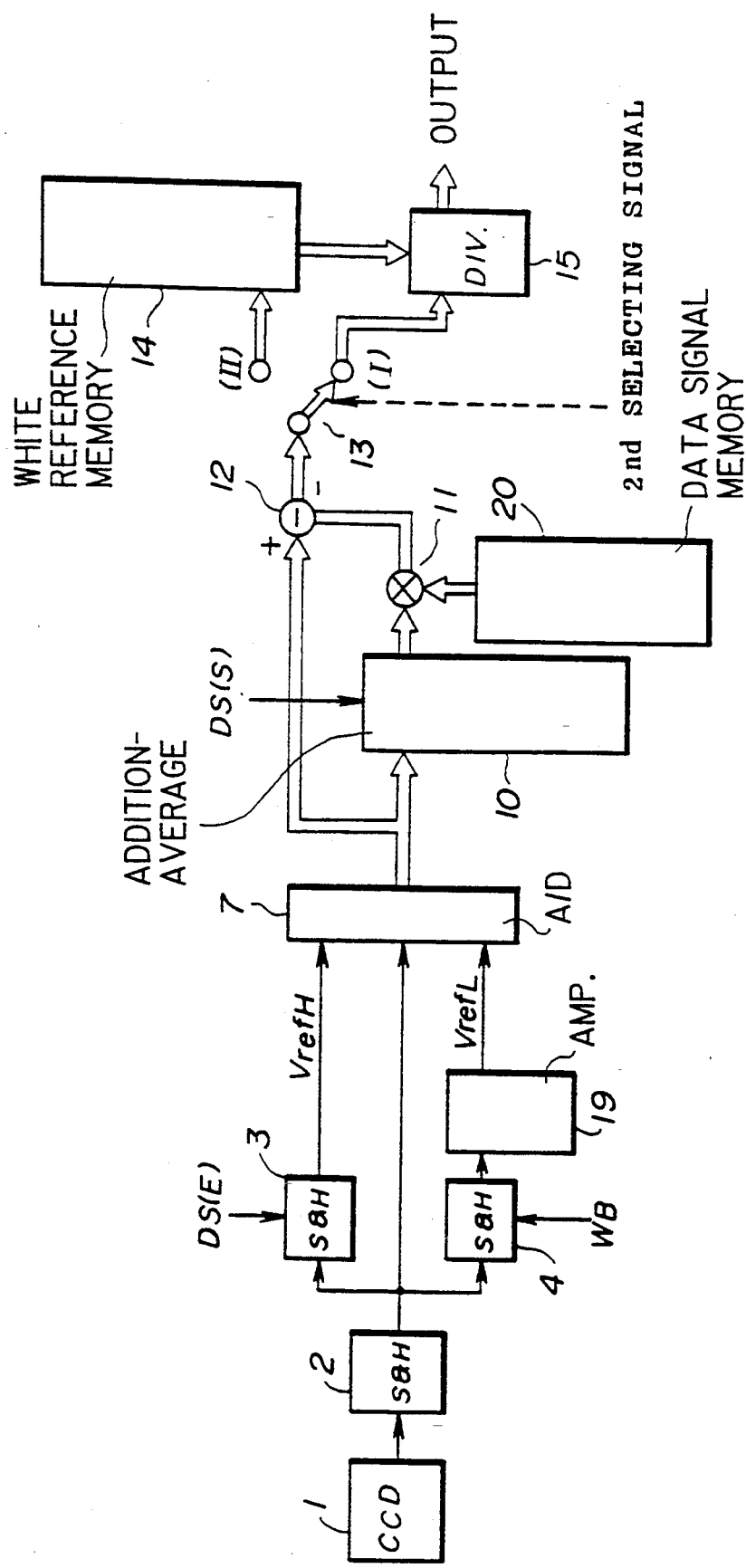
FIG. 6 is a block diagram illustrating a structure of an image reading apparatus according to a third embodiment of the present invention.

A description will now be given of a third embodiment of the present invention with reference to FIG. 6. In FIG. 6, those parts which are the same as those shown in FIG. 1 are given the same reference numbers.

Referring to FIG. 6, a dark signal memory 20 for storing the dark signal data for each cell of the CCD sensor 1 is formed of a read only memory 20 (ROM 20). That is, the dark signal data for each cell of the CCD sensor 1 has been previously obtained in accordance with a procedure as has been described in the above first embodiment. The dark signal data for each cell is obtained, for example, when this image reading apparatus is manufactured, or when the maintenance on this image reading apparatus is carried out. Then, the dark signal data for each cell of the CCD sensor 1 is stored in the ROM 20. In this image reading apparatus, the average of the white reference signals for the cells in the white detecting area WB is regularly supplied, as the lower reference signal $V_{refL}$, via an amplifier 19 to the analog-digital converter 7.

In a case where the dark current for each cell of the CCD sensor 1 hardly varies, the image reading apparatus according to the third embodiment can have the same advantages as those according to the above first embodiment.

Figure 7:
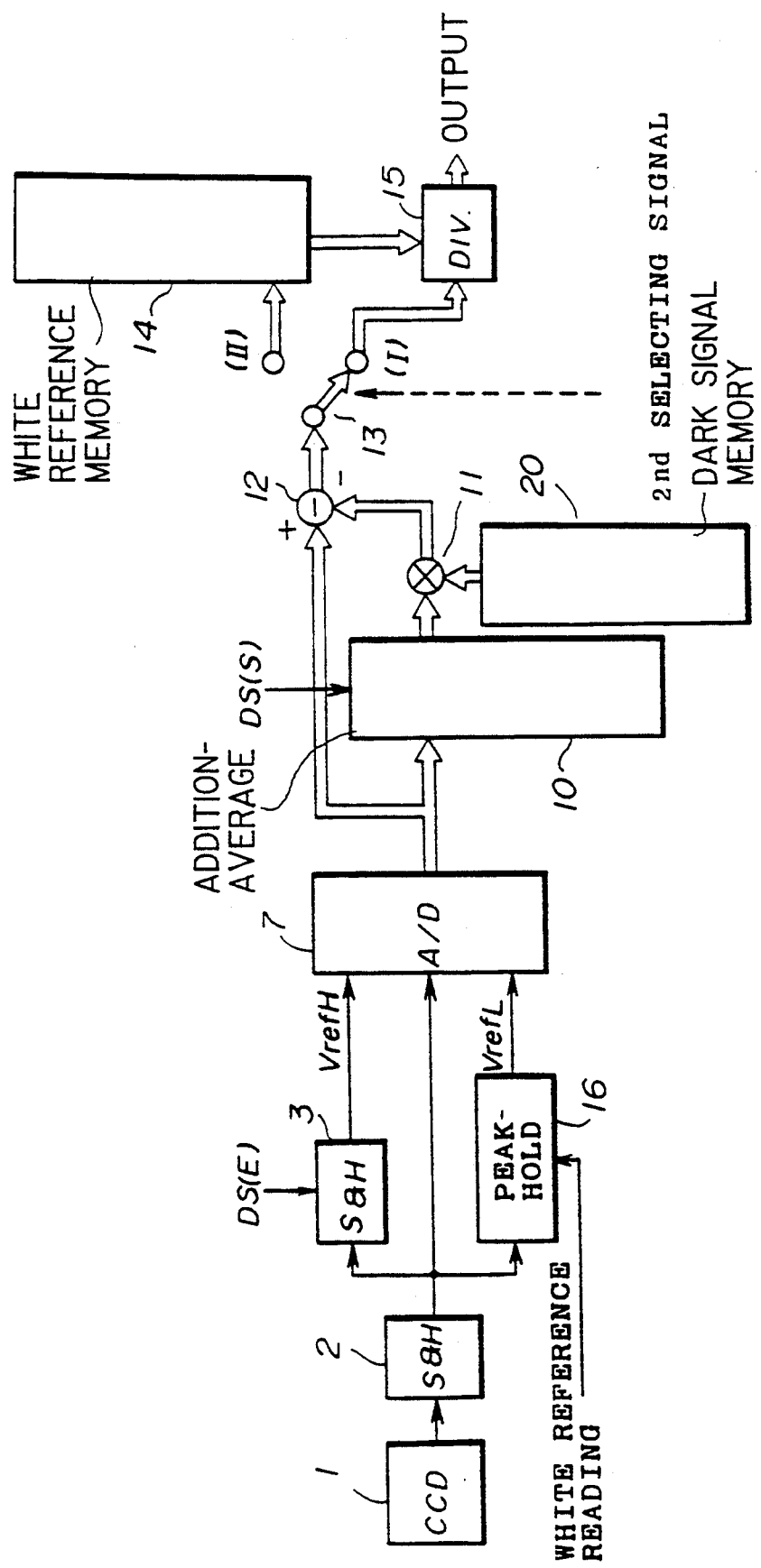
FIG. 7 is a block diagram illustrating a structure of an image reading apparatus according to a fourth embodiment of the present invention.

A description will now be given of a fourth embodiment with reference to FIG. 7. In FIG. 7, those parts which are the same as those shown in FIG. 6 are given the same reference numbers.

Referring to FIG. 7, this image reading apparatus also has the dark signal memory 20 in which the dark signal data for each cell of the CCD sensor 1 has been previously stored, in the same manner as that shown in FIG. 6. The dark signal memory 20 is formed of a ROM. In addition, this image reading apparatus has the peak-hold circuit 16 in the same manner as that shown in FIG. 4. That is, the peak-hold circuit 16 holds the peak level of the signal which is output from the CCD sensor 1 when the CCD sensor 1 scans the white reference plate. Then the peak level (corresponding to the white reference) is supplied, as the lower reference signal $V_{refL}$, to the analog-digital converter 7.

In a case where the amount of light from the lighting system hardly varies when the CCD sensor 1 scans the document and the dark current for each cell of the CCD sensor 1 hardly varies with the passage of time, the image reading apparatus according to the fourth embodiment can have the same advantages as that according to the above first embodiment.

Figure 8:
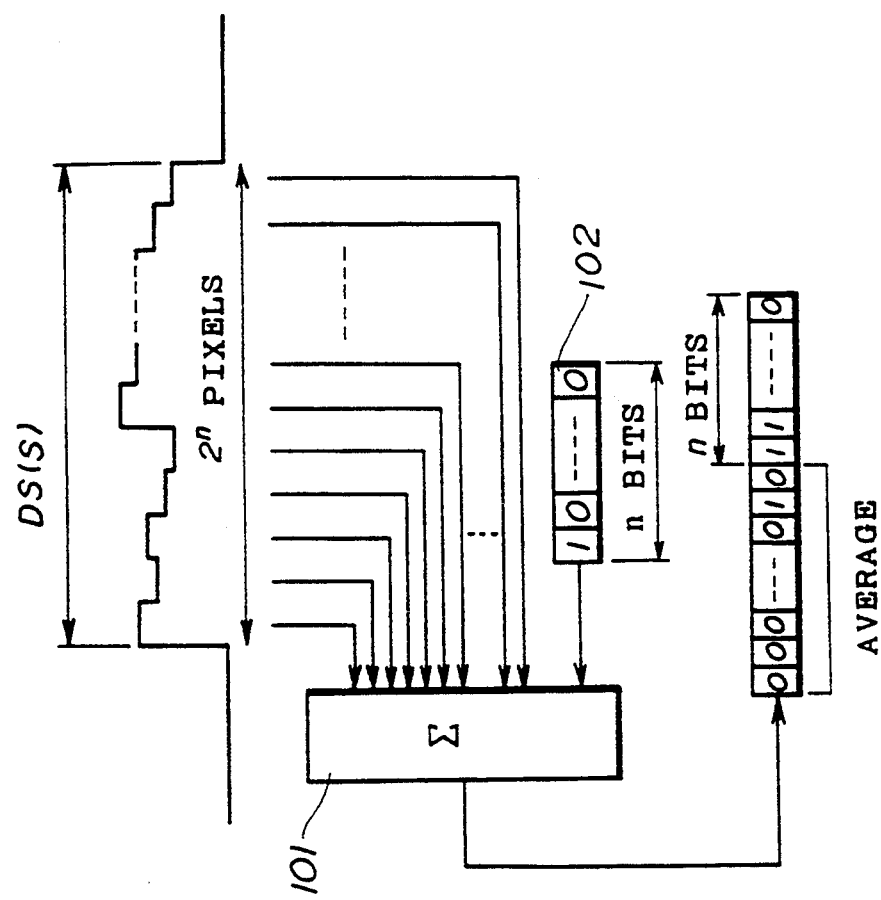
FIG. 8 is a diagram illustrating an addition-average circuit shown in FIGS. 1A, 4, 6 and 7.

The addition-average circuit 10 in each of the image reading apparatuses shown in FIGS. 1, 4, 6 and 7 has, for example, a structure shown in FIG. 8.

Referring to FIG. 8, the addition-average circuit 10 has an adder 101 and a register 102 which stores a n bit data "100 ... 0". The data for $2^n$ cells which are optically shielded in the second dummy signal area DS(S) are supplied from the analog-digital converter 7 to the adder 101. The n bit data stored in the register 102 is also supplied to the adder 101. The adder 101 adds the data for $2^n$ cells and the n bit data. In general, an operation for omitting the LSB (Least Significant Bit) from data corresponds to a calculation in which the data is multiplied by $\frac{1}{2}$, and to omit n bits starting from the LSB from data which corresponds to a calculation in which the data is multiplied by 1/n. Thus, n bits starting from the LSB of the output data from the adder 101 are omitted from the output data so that the average of the data for $2^n$ cells is obtained. That is, this addition-average circuit 10 outputs the average data.

As the n bit data "100 ... 0" is added to the other data, when the (n−1)-th bit of data obtained by the addition of the data for $2^n$ cells is "1", the n-th bit of the data is carried. In this case, the average data in which the LSB thereof is carried is obtained.

A description will now be given of a fifth embodiment of the present invention with reference to FIGS. 9, 10A, 10B, 10C, 10D and 10E.

Figure 9:
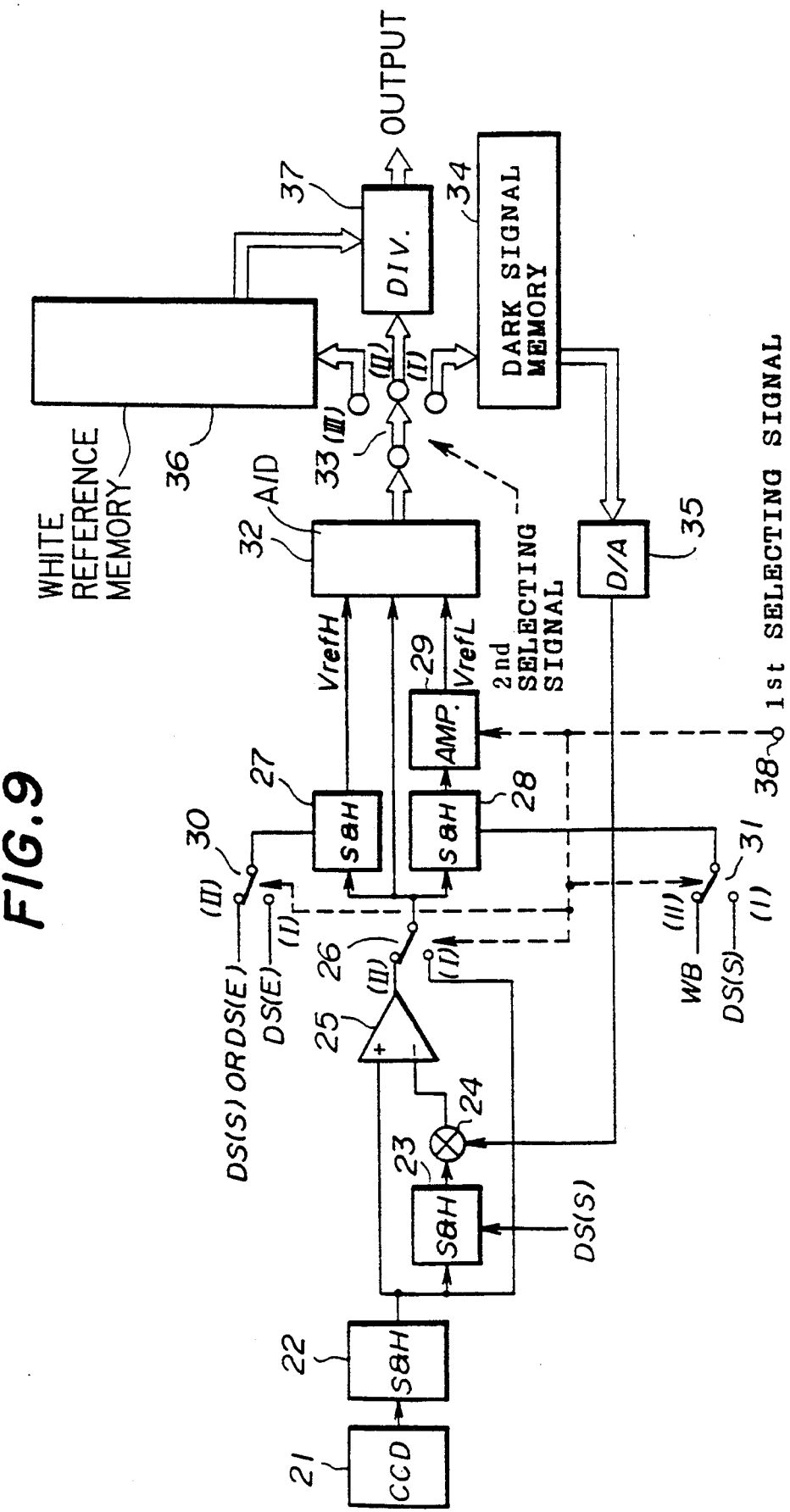
FIG. 9 is a block diagram illustrating a structure of an image reading apparatus according to a fifth embodiment of the present invention.

Referring to FIG. 9, which illustrates a structure of an image reading apparatus, a signal for each cell of a CCD sensor 21 is sampled and held in a sample-hold circuit 22 in synchronism with a predetermined timing clock. As shown in FIG. 1B, the CCD sensor 21 has cells arranged in the first dummy signal area DS(E), cells arranged in the second dummy signal area DS(S), cells arranged in the white detecting area WB, and cells arranged in the reading area. Each cell in the first dummy signal area DS(E) has no photoelectric conversion portion. Each cell in the second dummy signal area DS(S) is optically shielded.

The signal held in the first sample-hold circuit 22 is supplied to a second sample-hold circuit 23, a non-inverted terminal of a differential amplifier 25, and a first position (I) of a selector 26. The second sample-hold circuit 23 holds an average of the signals for the cells in the second dummy signal area DS(S). The average held in the second sample-hold circuit 23 is supplied to an analog multiplier 24. A signal output from the analog multiplier 24 is supplied to an inverted terminal of the differential amplifier 25. An output terminal of the differential amplifier 25 is connected to a second position (II) of the selector 26. The selector 26 selects either the first position (I) or the second position (II) in accordance with a first selecting signal. The first selecting signal is supplied from an external controller (not shown) via a control terminal 38 to the selector 26. The signal passing through the selector 26 is supplied to a third sample-hold circuit 27, a fourth sample-hold circuit 28, and an analog-digital converter 32. A selector 30 selects either a first position (I) or a second position (II) in accordance with the first selecting signal supplied from the external controller. When the selector 30 selects the first position (I), the third sample-hold circuit 27 samples and holds the signal for each of the cells in the first dummy signal area DS(E). When the selector 30 selects the second position (II), the third sample-hold circuit 27 samples and holds the signal for each of the cells in the first dummy signal area DS(E) or in the second dummy signal area DS(S). A selector 31 selects either a first position (I) or a second position (II) in accordance with the first selecting signal supplied from the external controller. When the selector 31 selects the first position (I), the fourth sample-hold circuit 28 holds an average of the signals for the cells in the second dummy signal area DS(S). When the selector 31 selects the second position (II), the fourth sample-hold circuit 28 holds an average of the signals for the cells in the white detecting area WB. The signal held in the fourth sample-hold circuit 28 is supplied to an amplifier 29. An amplification factor of the amplifier 29 is alternately switched between a first value and a second value in accordance with the first selecting signal supplied from the external controller. An output signal from the amplifier 29 is supplied, as a lower reference signal $V_{refL}$, to the analog-digital converter 32. The signal held in to the third sample-hold circuit 27 is supplied, as a upper reference signal $V_{refH}$, to the analog-digital converter 32.

A selector 33 selects either a first position (I), a second position (II), or a third position (III). When the selector 33 selects the first position (I), data output from the analog-digital converter 32 is supplied, as dark signal data, to a dark signal memory 34. The dark signal data is stored in the dark signal memory 34. When the selector 33 selects the third position (III), data output from the analog-digital converter 32 is supplied, as white reference data, to a white reference memory 36. The white reference data is stored in the white reference memory 36. When the selector 33 selects the second position (II), data (image signal data) corresponding to an image formed on the document is supplied from the analog-digital converter 32 to a divider 37. The divider 37 divides the data supplied from the analog-digital converter 32 by the white reference data supplied from the white reference memory 36.

The dark signal data read out from the dark signal memory 34 is supplied to a digital-analog converter 35. The digital-analog converter 35 converts the dark signal data into a signal having a level corresponding to the dark signal data. The signal output from the digital-analog converter 35 is supplied to the analog multiplier 24. The analog multiplier outputs a signal having a level obtained by the calculation in which the dark signal supplied from the second sample-hold circuit 23 is multiplied by the signal supplied from the digital-analog converter 35.

An output signal for one line from the CCD sensor 21 has a wave shape as shown in FIG. 2A which is the same shape as that of the output signal from the CCD sensor 1 in the above first embodiment. Then, when the output signal is sampled in the first sample-hold circuit 22, a component of a transferring clock used in the CCD sensor 21 is removed from the output signal shown in FIG. 2A so that the signal for one line output from the first sample-hold circuit 22 has a wave shape as shown in FIG. 2B.

In the image reading apparatus as described above, first, a dark signal level for each of the cells in one line of the CCD sensor 21 is detected.

In this case, each of the selectors 26, 30 and 31 selects the first position (I) based on the first selecting signal supplied from the external controller. The selector 33 selects the first position (I) based on the second selecting signal supplied from the external controller. The signal for one line output from the CCD sensor 21 is sampled by the first sample-hold circuit 22 under the condition where there is no exposure. Thus, the level of the signal corresponding to the dark current for each cell of the CCD sensor 21 is sampled in the first sample-hold circuit 22. When this sampling is carried out, the signal for the cell in the first dummy digital area DS(E) is sampled in the third sample-hold circuit 27. Then the signal supplied from the third sample-hold circuit 27 is used as the upper reference signal $V_{refH}$ of the analog-digital converter 32. At the same time, the average of the signals for the cells in the second dummy signal area DS(S) is sampled and held in the fourth sample-hold circuit 28. Then the average of the signals held in the fourth sample-hold circuit 28 is used as the lower reference signal $V_{refL}$ of the analog-digital converter 32. The signal for one line supplied to the analog-digital converter 32 varies within a range between the level of the upper reference signal $V_{refH}$ and the level of the lower reference signal $V_{refL}$, as shown in FIG. 10A.

The signal, which varies as shown in FIG. 10A, is formed of the dark signals for the cells in one line of the CCD sensor 21. The dark signal for each cell in one line is converted into the digital data by the analog-digital converter 32. The digital data output from the analog-digital converter passes through the selector 33 and is stored in the dark signal memory 34. The digital data for each cell stored in the dark signal memory 34 is referred to as dark signal data. As the lower reference signal $V_{refL}$ corresponds to the average of the dark signals for the cells in the second dummy signal area DS(S) of the CCD sensor 21, the dark signal data for each cell is represented by the ratio of the level of the dark signal for each cell to the level of the average of the dark signals for the cells which are optically shielded (see the above formula (1)).

After the dark signal data for each cell in one line of the CCD sensor 21 is stored in the dark signal memory 34, a signal corresponding to a predetermined white reference is sampled for each cell of the CCD sensor 21.

In this case, each of the selectors 26, 30 and 31 selects the second position (II) based on the first selecting signal supplied from the external controller. The selector 33 selects the third position (III) based on the second selecting signal supplied from the external controller. The CCD sensor 21 scans a white reference plate to obtain the white reference. The signal output from the first sample-hold circuit 22 is supplied to the non-inverted terminal of the differential amplifier 25. The signal for on line supplied to the non-inverted terminal of the differential amplifier 25 has a wave shape as shown in FIG. 10B. The signal for each cell in the second dummy signal area DS(S) includes only the dark signal. The signal for each cell in the white detecting area WB and the reading area includes a photoelectric conversion signal and the dark signal. The average of the signals for the cells in the second dummy signal area DS(S) is held in the second sample-hold circuit 23. The average of the signals for the cells in the second dummy signal area DS(S) is supplied from the second sample-hold circuit 23 to the analog multiplier 24. The dark signal data for each cell of the CCD sensor 21 is read out from the dark signal memory 34 and converted into the analog dark signal by a digital-analog converter 35. Then the analog multiplier 24 multiplies the analog dark signal for each cell from the digital-analog converter 35 by the average of the signals for the cells in the second dummy signal area DS(S). That is, the following calculation is carried out in the analog multiplier 24.

$$(\overline{d_{BK}}+\Delta \overline{d_{BK}})\times d_{BK}/\overline{d_{BK}}=d_{BK}+(\Delta \overline{d_{BK}}/\overline{d_{BK}})\cdot d_{BK} \qquad (8)$$

where $\overline{d_{BK}}$ denotes the average of the signals for the cells in the second dummy signal area DS(S), $\Delta \overline{d_{BK}}$ denotes a variation of the average of the signals for cells in the second dummy signal area DS(S), and $d_{BK}$ denotes the dark signal for each cell of the CCD sensor 21. In the above formula (8), $(\Delta \overline{d_{BK}}/\overline{d_{BK}})$ is a gradient of a variation of the average dark signal for the cells in the second dummy area DS(S). It can be assumed that the gradient of the variation of the average dark signal for the cells in the second dummy area DS(S) is approximately equal to a gradient of the variation of the dark signal for one of the cells of the CCD sensor 21. Thus, the above formula (8) is changed to the following formula (9):

$$d_{BK}+(\Delta \overline{d_{BK}}/\overline{d_{BK}})\cdot d_{BK}=d_{BK}+\Delta d_{BK} \qquad (9)$$

where $\Delta d_{BK}$ denotes the variation of the dark signal for each cell of the CCD sensor 21. That is, the analog multiplier 24 outputs the dark signal including the variation $\Delta d_{BK}$ thereof. Thus, even if the dark signal for each cell varies with the passage of time, the dark signal can be removed from the image signal for each cell by the differential amplifier 25. That is, the output signal from the differential amplifier 25 does not include the dark signal so that the differential amplifier 25 outputs only the photoelectric conversion signal for each cell of the CCD sensor 21. In this case, as the CCD sensor 21 scans the white reference plate, the photoelectric conversion signal output from the differential amplifier 25 corresponds to the white reference signal.

The signal from which the dark signal is removed is supplied from the differential amplifier 25 to the third and fourth sample-hold circuits 27 and 28 and the analog-digital converter 32. The average of the signals for the cells in the white detecting area WB is supplied via the amplifier 29, as the lower reference signal $V_{refL}$, to the analog-digital converter 32. The signal for the cell in the first or second dummy signal area DS(E) or DS(S) is supplied, as the upper reference signal $V_{refH}$, to the analog-digital converter 32. The signal supplied to the analog-digital converter 32 varies within a rage between the level of the lower reference signal $V_{refL}$ and the level of the upper reference signal $Vs_{refH}$, as shown in FIG. 10C. As the dark signal is removed from the signal output from the differential amplifier 25, the average of the signals for the cells in the white detecting area WB includes only the photoelectric conversion signal. Thus, in this case, the image signal corresponding to the white reference is normalized based on the photoelectric conversion signal for the cells in the white detecting area WS by the analog-digital converter 32. Then the data output for each cell of the CCD image sensor 21 from the analog-digital converter 32 is supplied via the selector 33, as the white reference data, to the white reference memory 36. The white reference data for each cell of the CCD sensor 21 is stored in the white reference memory 36.

After the white reference data for each cell of the CCD sensor 21 is stored in the white reference memory 36, the CCD sensor 21 scans the document on which the image is formed.

When the CCD sensor 21 scans the document, the first sample-hold circuit 22 samples and holds the image signal for each cell so that the signal output from the first sample-hold circuit 22 has a wave shape as shown in FIG. 10D. Then, the dark signal is removed from the image signal for each cell of the CCD sensor 21 in the same manner as that removed from the signal corresponding to the white reference. Then the image signal supplied to the analog-digital converter 32 varies within a rage between the level of the lower reference signal $V_{refL}$ and the level of the upper reference signal $V_{refH}$, as shown in FIG. 10E.

As the dark signal is removed from the image data, the image data output for each cell from the analog-digital converter 32 is not affected by the dark current generated in each corresponding cell in the same manner as the above white reference data. Then the divider 37 divides the image data supplied for each cell via the selector 33 by the white reference read out for each corresponding cell from the white reference memory 36 so that the shading compensation is carried out.

According to the above fifth embodiment, even if the dark signal for each cell of the CCD sensor 21 varies, the dark signal including the variation of the dark signal can be removed. Thus, even if the dark current generated in each cell of the CCD sensor 21 varies with the passage of time, only the photoelectric conversion signal for each cell of the CCD sensor 21 can be obtained.

In the above fifth embodiment, the average of the signals is held in each of the second and fourth sample-hold circuits 23 and 28. But, one of the signals for the cells can also be sampled, as a representative signal, in each of the second and the fourth sample-hold circuits 23 and 28.

Figure 11:
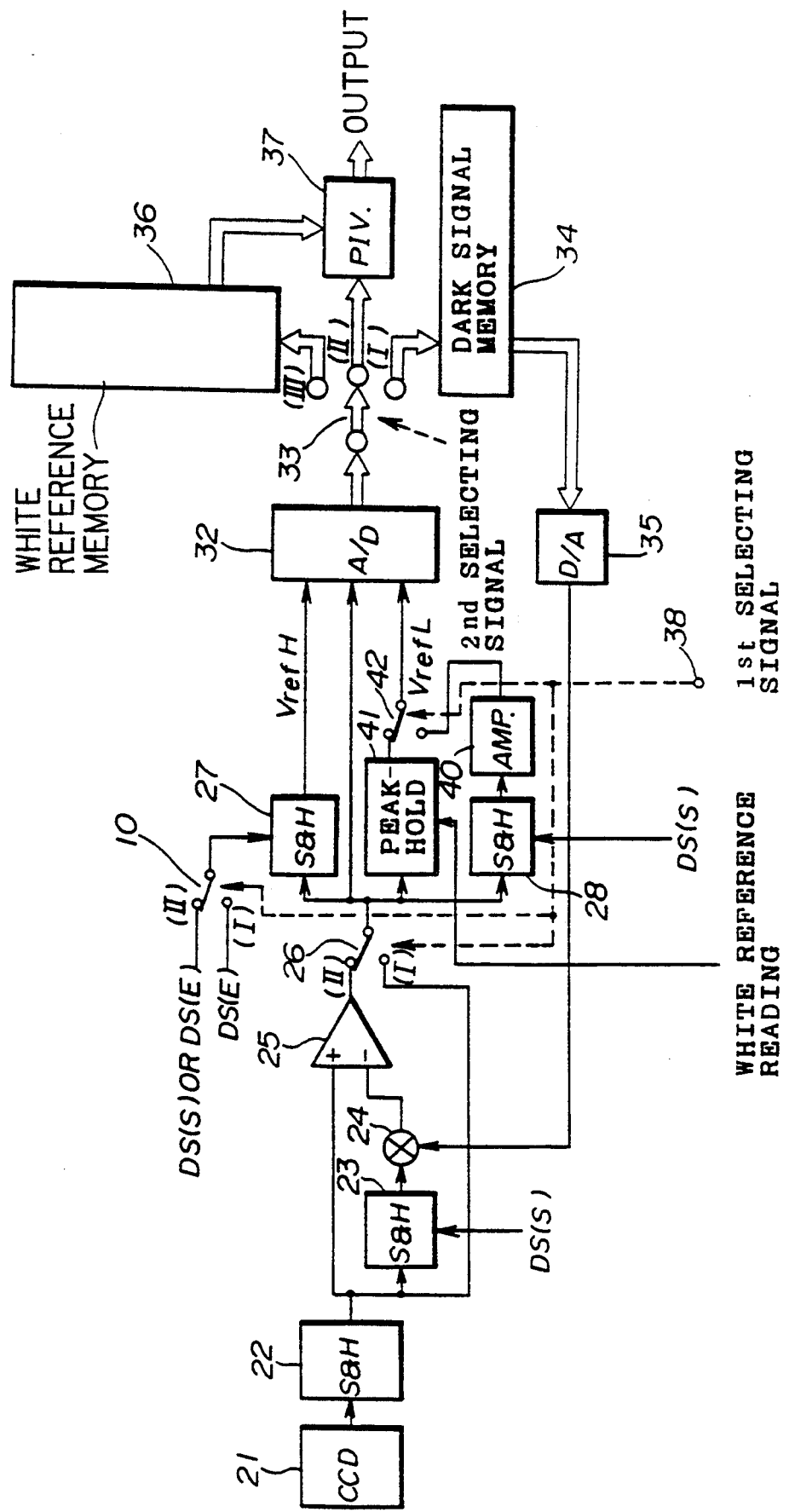
FIG. 11 is a block diagram illustrating a structure of an image reading apparatus according to a sixth embodiment of the present invention.

A description will be given of a sixth embodiment of the present invention with reference to FIGS. 11, 12A, 12B, 12C, 12D and 12E. In FIG. 11, which illustrates a structure of an image reading apparatus, those parts which are the same as those shown in FIG. 9 are given the same reference numbers.

In the CCD sensor 21 used in the image reading apparatus shown in FIG. 11, there is not the white detecting area WB shown in FIG. 1B, so that the CCD sensor has cells arranged in the first dummy signal area DS(E), cells arranged in the second dummy signal area DS(S) and cells arranged in the reading area. Each cell in the first dummy signal area DS(E) has no photoelectric conversion portion and each cell in the second dummy signal area DS(S) is optically shielded.

As the CCD sensor 21 does not have the white detecting area WB in it, the image reading apparatus shown in FIG. 11 has a peak-hold circuit 41. When the CCD sensor 21 scans the white reference plate for one line, a peak level of the signal output from the differential amplifier 25 is held in the peak-hold circuit 41. The peak level held in the peak-hold circuit 41 is supplied via a selector 42 to the analog-digital converter 32, and used as the lower reference signal $V_{refL}$ of the analog-digital converter 32 in a case where the white reference data for each cell of the CCD sensor 1 is obtained.

When the dark signal level for each cell is detected, the average of the signals for the cells in the second dummy signal area DS(S) is held in the fourth sample-hold circuit 28. Then the average of the signals for the cells in the second dummy signal area DS(S) is supplied via the selector 42, as the lower reference signal $V_{refL}$, to the analog-digital converter 32.

Other operations in the image reading apparatus shown in FIG. 11 are equal to the operations in that of the fifth embodiment, shown in FIG. 9. In the sixth embodiment, when the dark signal level for each cell is detected, the signal output for one line from the first sample-hold circuit 22 varies within a range between the level of the lower reference signal $V_{refL}$ and the level of the upper reference signal $V_{refH}$, as shown in FIG. 12A. When the white reference data is detected, the signal output for one line from the first sample-hold circuit 22 varies as shown in FIG. 12B. At this time, the signal output for one line from the differential amplifier 25 varies within a range between the level of the lower reference signal $V_{refL}$ and the level of the upper reference signal $V_{refH}$, as shown in FIG. 10C. When the CCD sensor 21 scans the document, the signal output for one line from the first sample-hold circuit 22 varies as shown in FIG. 12D. At this time, the signal output for one line from the differential amplifier 25 varies within a range between the level of the lower reference signal $V_{refL}$ and the level of the upper reference signal $V_{refH}$, as shown in FIG. 12E.

In a case where the amount of light from the lighting system of the image reading apparatus hardly varies when the CCD sensor 21 scans the document, the image reading apparatus according to the sixth embodiment can have the same advantages as that according to the fifth embodiment.

In the above fifth and sixth embodiments, it is preferable that a integral time for each cell in a case where the dark signal is detected be greater than that for each cell in a case where the CCD sensor 21 scans the document. In this case, as the level of the dark signal for each cell increases, influences of various noises on the dark signal can be relatively decreased. As the dark signal data stored in the dark signal memory 34 corresponds to the ratio of the level of the dark signal for each cell to the average of the dark signals for the cells which are optically shielded (DS(S)), even if the dark signal for each cell increases due to the increasing of the integral time, the dark signal data does not vary.

Figure 13:
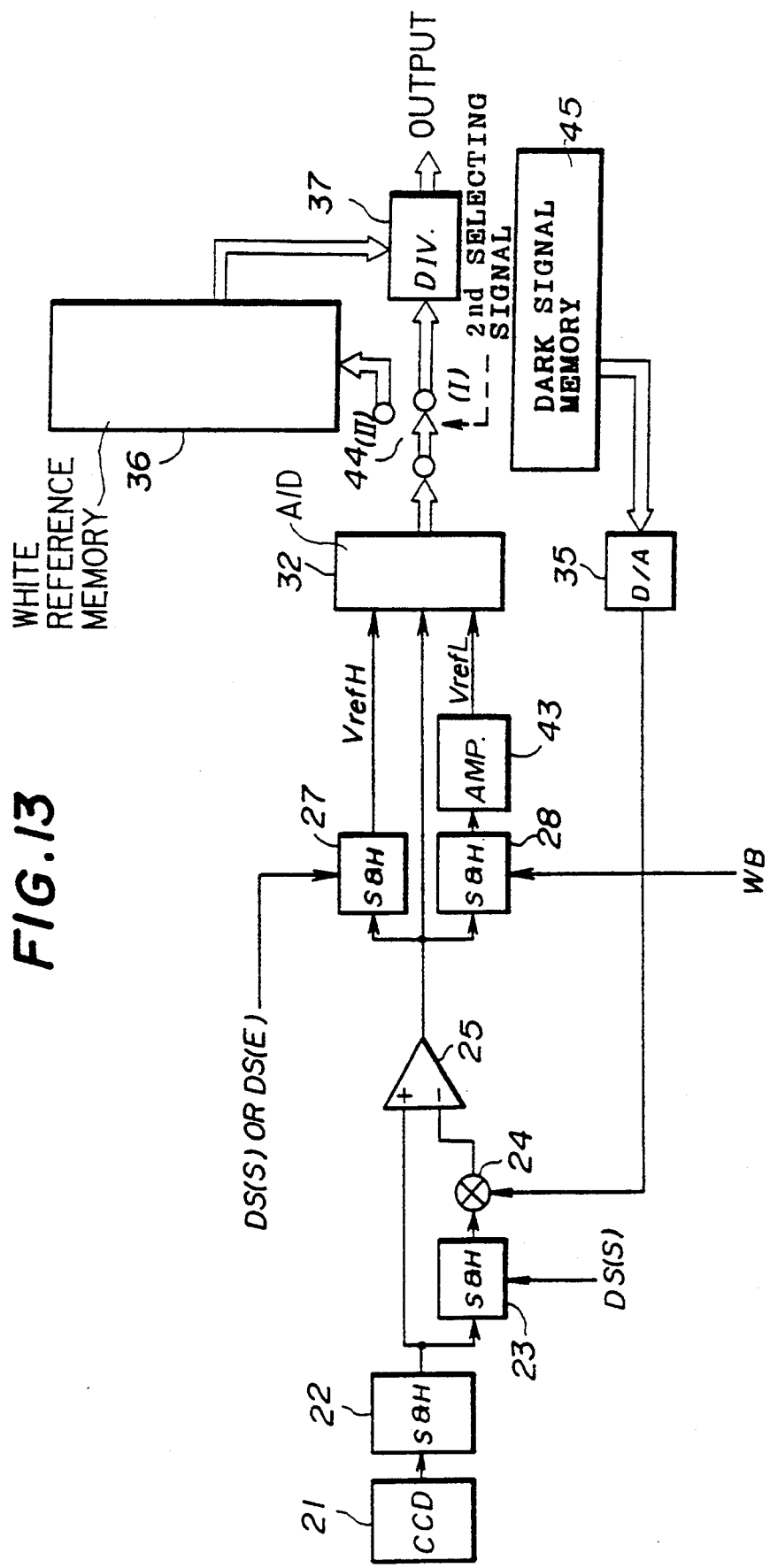
FIG. 13 is a block diagram illustrating a structure of an image reading apparatus according to a seventh embodiment of the present invention.

A description will now be given of a seventh embodiment of the present invention with reference to FIG. 13. In FIG. 13, those parts which are the same as those shown in FIG. 9 are given the same reference numbers.

Referring to FIG. 13, a dark signal memory 45 for storing the dark signal data for each cell of the CCD sensor 21 is formed of a read only memory (ROM). That is, the dark signal data for each cell of the CCD sensor 21 has been previously obtained in accordance with a procedure as has been described in the above fifth embodiment. The dark signal data for each cell is obtained, for example, when this image reading apparatus is manufactured, or when the maintenance of this image reading apparatus is carried out. Then, the dark signal data for each cell of the CCD sensor 21 has been previously stored in the ROM 45. In this image reading apparatus, the average of the white reference signals for the cells in the white detecting area WB is regularly supplied, as the lower reference signal $V_{refL}$, via an amplifier 43 to the analog-digital converter 32.

In a case where the dark current for each cell of the CCD sensor 21 hardly varies, the image reading apparatus according to the seventh embodiment can have the same advantages as that according to the above fifth embodiment.

Figure 14:
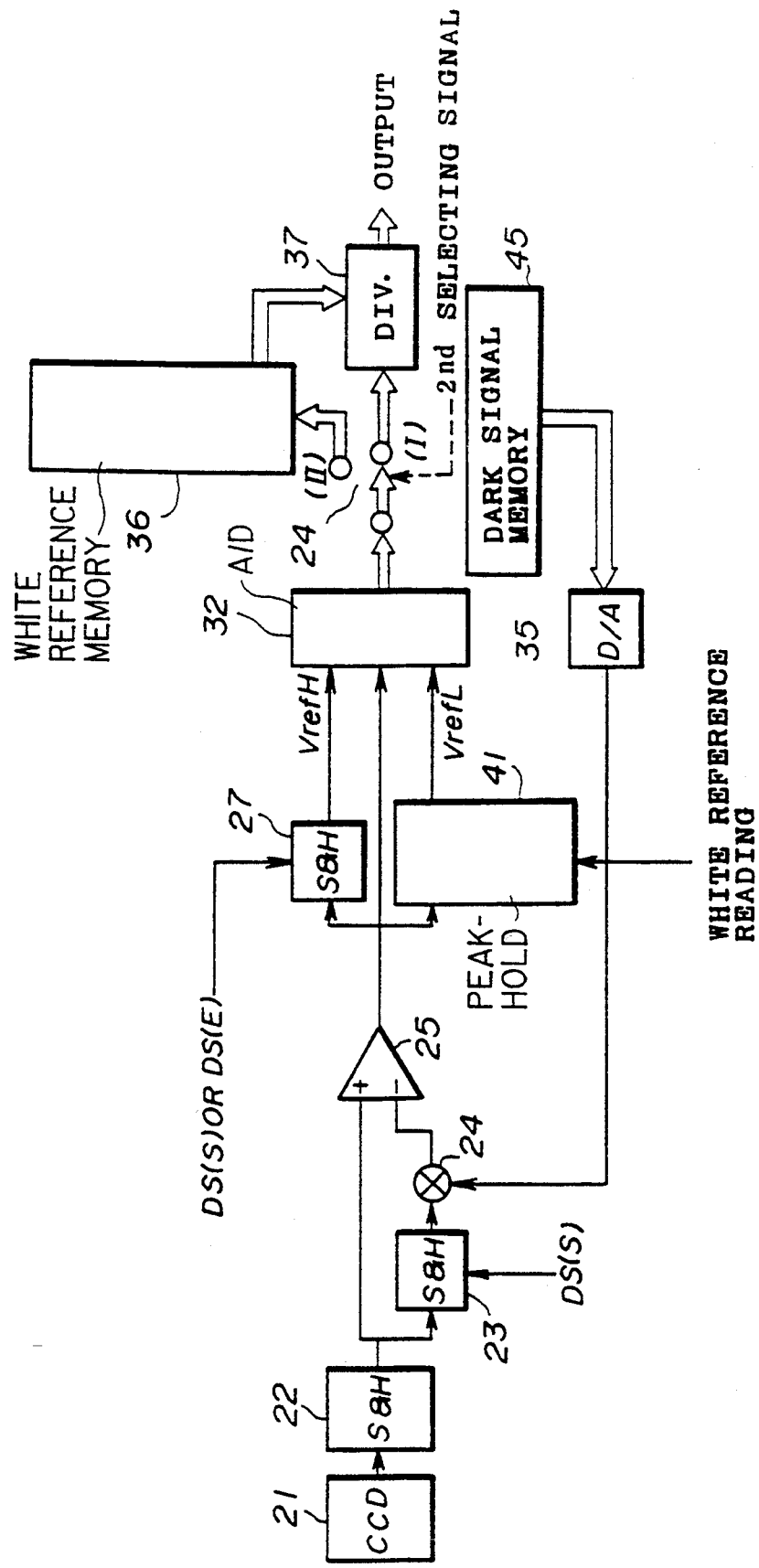
FIG. 14 is a block diagram illustrating a structure of an image reading apparatus according to a eighth embodiment of the present invention.

A description will now be given of an eighth embodiment of the present invention with reference to FIG. 14. In FIG. 14, those parts which are the same as those shown in FIG. 9 are given the same reference numbers.

Referring to FIG. 14, this image reading apparatus also has the dark signal memory 45 in which the dark signal data for each cell of the CCD sensor 21 has been previously stored, in the same manner as that shown in FIG. 13. The dark signal memory 45 is formed of a ROM. In addition, this image reading apparatus has the peak-hold circuit 41 in the same manner as that shown in FIG. 11. That is, the peak-hold circuit 41 holds the peak level of the signal which is output from the differential amplifier 25 when the CCD sensor 21 scans the white reference plate. Then the peak level (corresponding to the white reference) is supplied, as the lower reference signal $V_{refL}$, to the analog-digital converter 32.

In a case where the amount of light from the lighting system of this image reading apparatus hardly varies when the CCD sensor 21 scans the document and the dark current for each cell of the CCD sensor 21 hardly varies with the passage of time, the image reading apparatus according to the eighth embodiment can have the same advantage as that according to the above fifth embodiment.

The present invention is not limited to the aforementioned embodiments, and variations and modifications may be made without departing from the scope of the claimed invention.

What is claimed is:

1. An image reading apparatus comprising:
   a photoelectric conversion element which has a plurality of cells, each cell generating an image signal including a photoelectric conversion signal corresponding to the amount of light incident thereto and a dark signal based on a dark current generated therein, said plurality of cells including shielded cells which are optically shielded so that each shielded cell outputs only the dark signal;
   dark signal data generator for generating dark signal data under a no-exposure condition where there is no light incident to said photoelectric conversion element, said dark signal data corresponding to a ratio of an image signal generated from each cell under the no-exposure condition to a first reference dark signal which is obtained based on the dark signals output from the shielded cells under the no-exposure condition;
   dark signal data storage means for storing said dark signal data for each cell of said photoelectric conversion element;
   dark signal component generating means for generating a dark signal component for each cell of said photoelectric conversion element under an exposure condition where a light is incident to said photoelectric conversion element, said dark signal component corresponding to a product of said dark signal data stored for each cell in said dark signal data storage means multiplied by a second reference dark signal which is obtained based on the dark signals output from the shielded cells under the exposure condition; and
   dark signal removing means, coupled to said dark signal component generating means, for removing the dark signal component generated for each cell by said dark signal component generating means from an image signal output from each corresponding cell of said photoelectric conversion element under the exposure condition,
   wherein said image reading apparatus outputs the image signal from which the dark signal component is removed for each cell of said photoelectric conversion element.

2. An image reading apparatus as claimed in claim 1, wherein a longer period of time is required for generating the image signal for each cell under the no-exposure condition than is required for generating the image signal for each cell under the exposure condition.

3. An image reading apparatus as claimed in claim 1, wherein said dark signal component generating means comprises;
   first means for generating the second reference dark signal based on the dark signals from the shielded cells under the exposure condition,
   second means for generating the product of said dark signal data for each cell multiplied by the second reference dark signal generated by said first means,
   wherein said product generated by said second means corresponds to the dark signal component for each cell.

4. An image reading apparatus comprising:
   a photoelectric conversion element which has a plurality of cells, each cell generating an image signal including a photoelectric conversion signal corresponding to the amount of light incident thereto and a dark signal based on a dark current generated therein, said plurality of cells including shielded cells which are optically shielded so that each shielded cell outputs only the dark signal;
   an analog-digital converter, coupled to said photoelectric conversion element, for converting the image signal for each cell of said photoelectric conversion element based on a reference signal into digital data;
   dark signal data generator for generating dark signal data under a no-exposure condition where there is no light incident to said photoelectric conversion element, said dark signal data corresponding to a ratio of an image signal generated from each cell under the no-exposure condition to a first reference dark signal which is obtained based on the dark signals output from the shielded cells under the no-exposure condition;
   dark signal data storage means for storing the dark signal data for each cell of said photoelectric conversion element;
   dark signal component generating means for generating a dark signal component for each cell of said photoelectric conversion element, said dark signal component generating means comprising,
   a) first means for generating reference dark signal data based on the digital data output from said analog-digital converter when the dark signals for the shielded cells and a predetermined reference signal are supplied to said analog-digital converter under the exposure condition, and
   b) second means for generating a product of said dark signal data stored for each cell in said dark signal storage means multiplied by the reference dark signal data generated by said first means, said product being used as the dark signal component; and dark signal removing means, coupled to said dark signal component generating means, for removing the dark signal component generated for each cell by said second means from the digital data output from said analog-digital converter when the image signal for each corresponding cell is supplied to said analog-digital converter, wherein said image reading apparatus outputs image signal data from which the dark signal component is removed for each cell of said photoelectric conversion element.

5. An image reading apparatus as claimed in claim 4, wherein said first means of said dark signal component generating means has calculating means for calculating an average data of the dark signals for shielded cells of said photoelectric conversion element, said average data being used as the reference dark signal data.

6. An image reading apparatus comprising:

a photoelectric conversion element which has a plurality of cells, each cell generating an image signal including a photoelectric conversion signal corresponding to the amount of light incident thereto and a dark signal based on a dark current generated therein, said plurality of cells including shielded cells which are optically shielded so that each shielded cell outputs only the dark signal;

an analog-digital converter, coupled to said photoelectric conversion element, for converting the image signal for each cell of said photoelectric conversion element based on a reference signal into digital data;

dark signal data generating means for generating dark signal data for each cell of said photoelectric conversion element, said dark signal data generating means comprising, a) first supply means for supplying the image signal for each cell of the photoelectric conversion element to said analog-digital converter, said image signal being obtained for each cell under a no-exposure condition where there is no light incident to said photoelectric conversion element, and b) second supply means for supplying a first reference dark signal to said analog-digital converter, said first reference dark signal being obtained based on the dark signals output from the shielded cells under the no-exposure condition so that the digital data output from said analog-digital converter corresponds to a ratio of the image signal for each cell to the first reference dark signal, said digital data being used as the dark signal data;

dark signal data storage means, coupled to said analog-digital converter, for storing the dark signal data output for each cell from said analog-digital converter;

dark signal component generating means for generating a dark signal component for each cell of said photoelectric conversion element, said dark signal component generating means comprising, a) first means for generating a second reference dark signal based on the dark signals for the shielded cells, b) second means for converting the dark signal data stored for each cell in said dark signal data storage means into an analog signal, and c) third means for generating a product of said analog signal obtained for each cell by said second means multiplied by the second reference dark signal generated by said first means, said product being used as the dark signal component; and dark signal removing means, coupled to said third means of said dark signal component generating means and said photoelectric conversion element, for subtracting the dark signal component generated for each cell by said third means from the image signal for each cell of said photoelectric conversion element, wherein the image signal from which the dark signal component is removed for each cell of said photoelectric conversion element is supplied to said analog digital converter.

7. An image reading apparatus comprising:

a photoelectric conversion element which has a plurality of cells, each cell generating an image signal including a photoelectric conversion signal corresponding to the amount of light incident thereto and a dark signal based on a dark current generated therein, said plurality of cells including shielded cells which are optically shielded so that each shielded cell outputs only the dark signal;

an analog-digital converter, coupled to said photoelectric conversion element, for converting the image signal for each cell of said photoelectric conversion element based on a reference signal into digital data;

dark signal data generator for generating dark signal data under a no-exposure condition where there is no light incident to said photoelectric conversion element, said dark signal data corresponding to a ratio of an image signal generated from each cell under the no-exposure condition to a first reference dark signal which is obtained based on the dark signals output from the shielded cells under the no-exposure condition;

dark signal data storage means for storing the dark signal data output from said analog-digital converter for each cell;

dark signal component generating means for generating a dark signal component for each cell of said photoelectric conversion element, said dark signal component generating means comprising, a) first means for generating a second reference dark signal based on the dark signal for the shielded cells, b) second means for converting the dark signal data stored for each cell in said dark signal data storage means into an analog signal, and c) third means for generating a product of said analog signal obtained for each cell by said second means multiplied by the second reference dark signal generated by said first means, said product being used as the dark signal component; and dark signal removing means, coupled to said third means of said dark signal component generating means and said photoelectric conversion element, for subtracting the dark signal component generated for each cell by said third means from the image signal for each cell of said photoelectric conversion element, wherein the image signal from which the dark signal component is removed for each cell of said photoelectric conversion element is supplied to said analog digital converter.

* * * * *